United States Patent
Kim et al.

(10) Patent No.: US 11,601,918 B2
(45) Date of Patent: Mar. 7, 2023

(54) METHOD AND APPARATUS FOR BUFFER STATUS REPORT IN MOBILE COMMUNICATION SYSTEM

(71) Applicant: Samsung Electronics Co., Ltd., Gyeonggi-do (KR)

(72) Inventors: Soeng-Hun Kim, Gyeonggi-do (KR); Gert Jan Van Lieshout, Middlesex (GB); Kyeong-In Jeong, Gyeonggi-do (KR); Himke Van Der Velde, Middlesex (GB)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/677,310

(22) Filed: Feb. 22, 2022

(65) Prior Publication Data

US 2022/0182988 A1 Jun. 9, 2022

Related U.S. Application Data

(63) Continuation of application No. 16/676,142, filed on Nov. 6, 2019, now Pat. No. 11,259,282, which is a
(Continued)

(30) Foreign Application Priority Data

Nov. 15, 2006 (KR) .................. 10-2006-0113011

(51) Int. Cl.
*H04W 72/04* (2009.01)
*H04L 47/30* (2022.01)
(Continued)

(52) U.S. Cl.
CPC ............ *H04W 72/04* (2013.01); *H04L 47/30* (2013.01); *H04L 47/35* (2013.01); *H04W 8/04* (2013.01);
(Continued)

(58) Field of Classification Search
None
See application file for complete search history.

(56) References Cited

U.S. PATENT DOCUMENTS 6,052,737 A 4/2000 Bitton
6,570,853 B1 * 5/2003 Johnson ............... H04L 47/39
370/395.2
(Continued)

FOREIGN PATENT DOCUMENTS

CN 1604685 4/2005
JP 2005-094750 4/2005
(Continued)

OTHER PUBLICATIONS

Samsung, "Buffer Status Reporting Triggers for EDCH", Tdoc R2-050835, 3GPP TSG-RAN2 Meeting #46bis, Apr. 4-8, 2005.
(Continued)

*Primary Examiner* — Anh Ngoc M Nguyen
(74) *Attorney, Agent, or Firm* — The Farrell Law Firm, P.C.

(57) ABSTRACT

Method for radio communication with base station, by user equipment (UE), apparatus in UE for radio communication with base station, a method for radio communication with a UE by a base station, and an apparatus in a base station for radio communication with a UE are provided. The method for radio communication with a base station, by a UE, includes determining whether to start a first timer based on a predetermined condition, in response to a buffer status reporting triggered; starting the first timer in response to the predetermined condition being satisfied; in response to an uplink resource for a buffer status report transmission being available before the first timer expires, transmitting an uplink packet including a buffer status report using the available uplink resource; and in response to no uplink resource for the buffer status report transmission being
(Continued)

available and the first timer expiring, transmitting a scheduling request to the base station.

18 Claims, 5 Drawing Sheets

Related U.S. Application Data continuation of application No. 16/293,093, filed on Mar. 5, 2019, now Pat. No. 10,694,502, which is a continuation of application No. 15/676,439, filed on Aug. 14, 2017, now Pat. No. 10,225,822, which is a continuation of application No. 14/704,480, filed on May 5, 2015, now Pat. No. 9,736,818, which is a continuation of application No. 13/690,893, filed on Nov. 30, 2012, now Pat. No. 9,025,444, which is a continuation of application No. 12/515,115, filed as application No. PCT/KR2007/005667 on Nov. 12, 2007, now abandoned.

(51) Int. Cl.
| | | |
|---|---|---|
| *H04L 47/35* | (2022.01) | |
| *H04W 28/12* | (2009.01) | |
| *H04W 8/04* | (2009.01) | |
| *H04W 72/044* | (2023.01) | |
| *H04W 28/02* | (2009.01) | |
| *H04W 72/10* | (2009.01) | |

(52) U.S. Cl.
CPC ....... *H04W 28/0278* (2013.01); *H04W 28/12* (2013.01); *H04W 72/044* (2013.01); *H04W 72/10* (2013.01)

(56) References Cited

U.S. PATENT DOCUMENTS

| | | |
|---|---|---|
| 7,023,833 B1 | 4/2006 | Aiello et al. |
| 7,539,160 B2 | 5/2009 | Virtanen et al. |
| 7,818,647 B2 | 10/2010 | Lohr et al. |
| 9,025,444 B2 | 5/2015 | Kim |
| 9,516,536 B2 | 12/2016 | Zhang |
| 2005/0047416 A1* | 3/2005 | Heo ................. H04W 8/24 370/412 |
| 2005/0083943 A1* | 4/2005 | Lee .................. H04W 8/04 370/342 |
| 2005/0259662 A1 | 11/2005 | Kim et al. |
| 2006/0246847 A1 | 11/2006 | Kim et al. |
| 2008/0045255 A1 | 2/2008 | Revel |
| 2008/0081651 A1 | 4/2008 | Kuroda et al. |
| 2014/0016601 A1 | 1/2014 | Heo et al. |

FOREIGN PATENT DOCUMENTS

| | | |
|---|---|---|
| KR | 1020060082734 | 7/2006 |
| WO | WO 2005/109690 | 11/2005 |
| WO | WO 2006/016457 | 2/2006 |

OTHER PUBLICATIONS

Written Opinion of Int'l Searching Authority PCT/KR2007/005667 (Form PCT/ISA/237) (3pp.), dated Feb. 19, 2008.

* cited by examiner

METHOD AND APPARATUS FOR BUFFER STATUS REPORT IN MOBILE COMMUNICATION SYSTEM

PRIORITY

This application is a continuation application of U.S. patent application Ser. No. 16/676,142, filed on Nov. 6, 2019, in the United States Patent and Trademark Office (USPTO), which is a continuation application of U.S. patent application Ser. No. 16/293,093, filed on Mar. 5, 2019, in the USPTO (now U.S. Pat. No. 10,694,502 issued on Jun. 23, 2020), which is a continuation application of U.S. patent application Ser. No. 15/676,439, filed on Aug. 14, 2017, in the USPTO (now U.S. Pat. No. 10,225,822 issued on Mar. 5, 2019), which is a continuation application of U.S. patent application Ser. No. 14/704,480, filed on May 5, 2015, in the USPTO (now U.S. Pat. No. 9,736,818 issued on Aug. 15, 2017), which is a continuation application of U.S. patent application Ser. No. 13/690,893, filed on Nov. 30, 2012, in the USPTO (now U.S. Pat. No. 9,025,444 issued on May 5, 2015), which is a continuation application of U.S. patent application Ser. No. 12/515,115 (now abandoned), which was filed on May 15, 2009 in the USPTO, and claims priority under 35 U.S.C. § 365 to International Application No. PCT/KR2007/005667, which was filed on Nov. 12, 2007, and under 35 U.S.C. § 119(a) to Korean Patent Application No. 10-2006-0113011, which was filed in the Korean Intellectual Property Office on Nov. 15, 2006, the entire content of each of which is incorporated herein by reference.

BACKGROUND OF THE INVENTION

1. Field of the Invention

The present invention relates to mobile communication systems, and more particularly to a method and an apparatus for periodically reporting the buffer status in a mobile communication system.

2. Description of the Related Art

As generally known in the art, the LTE (Long Term Evolution), which is the evolved mobile communication system of the third-generation mobile communication system of UMTS (Universal Mobile Telecommunication Service), provides a high-speed packet service based on the OFDM. In the case of a mobile communication system in which the Node B dynamically allocates a transmission resource, such as LTE or EUDCH (Enhanced Uplink Dedicate Channel), the UE must report the buffer status to the Node B prior to transmitting data through the uplink. Schemes for reporting the buffer status include an event-triggered scheme in which a buffer status report message is transmitted if a specific condition is satisfied, and a periodic scheme in which a buffer status report message is transmitted at a predetermined cycle.

In the case of the EUDCH, both the event-triggered scheme and the periodic scheme have been adopted. Both schemes are also expected to be employed by the LTE.

FIG. 1 shows an exemplary scheme for periodically reporting the buffer status according to the prior art.

When such a periodic scheme is employed, the UE activates a timer after completing the transmission of a buffer status report message. If the timer expires, the UE transmits a new buffer status report message.

Referring to FIG. 1, if no transmission resource has been allocated to the UE 105 when the timer has expired (115), the UE 105 transmits a signal for a scheduling request, for example, to the Node B 110 (120), which then is allocated a transmission resource for the buffer status report (125). The UE 105 then transmits a buffer status report message based on the allocated transmission resource (130).

On the other hand, if the UE 105 has a transmission resource allocated thereto when the timer has expired (135), the UE 105 piggybacks the buffer status report message onto the uplink data by using the allocated transmission resource, and transmits it.

In other words, if the UE is to transmit a buffer status report message with no transmission resource allocated thereto, the UE must transmit a separate uplink signal to the Node B (120), and receive a downlink transmission resource allocation signal from the Node B (125). If a transmission resource has been allocated (135), the UE can directly piggyback and transmit an uplink signal, which includes a buffer status report message, without exchanging a separate control message for transmitting the buffer status report message (140). As such, the buffer status report message is preferably transmitted after a transmission resource has been allocated.

SUMMARY OF THE INVENTION

Accordingly, the present invention is designed to address at least the problems and/or disadvantages described above and to provide at least the advantages described below.

An aspect of the present invention is to provide a method and an apparatus for periodically reporting the buffer status by a UE in such a manner that the buffer status report is conducted according to whether or not a transmission resource can be allocated.

In accordance with an aspect of the present invention, a method is provided for radio communication with a base station, by a UE. The method includes determining whether to start a first timer based on a predetermined condition, in response to a buffer status reporting triggered; starting the first timer in response to the predetermined condition being satisfied; in response to an uplink resource for a buffer status report transmission being available before the first timer expires, transmitting an uplink packet including a buffer status report using the available uplink resource; and in response to no uplink resource for the buffer status report transmission being available and the first timer expiring, transmitting a scheduling request to the base station.

In accordance with an aspect of the present invention, an apparatus in a UE for radio communication with a base station is provided. The apparatus includes a controller configured to determine whether to start a first timer based on a predetermined condition, in response to a buffer status reporting triggered, and start the first timer in response to the predetermined condition being satisfied; and a transceiver configured to, in response to an uplink resource for a buffer status report transmission being available before the first timer expires, transmit an uplink packet including a buffer status report using the available uplink resource, and, in response to no uplink resource for buffer status report transmission being available and the first timer expiring, transmitting a scheduling request to the base station.

In accordance with an aspect of the present invention, a method for radio communication with a UE by a base station is provided. The method includes receiving an uplink packet including a buffer status report from the UE using an uplink resource in response to the uplink resource allocated for a buffer status report transmission being available for the UE; and receiving a scheduling request from the UE in response to an available uplink resource not being allocated to the UE after a predetermined time after a buffer status reporting is triggered by the UE. The scheduling request is received in response to no uplink resource for the buffer status report transmission being available and a first timer expiring. The first timer starts in response to the UE identifying that the buffer status reporting is triggered and a predetermined condition is satisfied.

In accordance with an aspect of the present invention, an apparatus in a base station for radio communication with a UE is provided. The apparatus includes a receiver configured to receive an uplink packet including a buffer status report and a scheduling request from the UE; and a controller configured to allocate an uplink resource to the UE in response to the scheduling request. The receiver is configured to receive the uplink packet including the buffer status report from the UE using the uplink resource, in response to the uplink resource allocated for a buffer status report transmission being available for the UE. The receiver is configured to receive the scheduling request from the UE in response to an available uplink resource not being allocated to the UE after a predetermined time after a buffer status reporting is triggered by the UE. The scheduling request is received in response to no uplink resource for the buffer status report transmission being available and a first timer expiring. The first timer starts in response to the UE identifying that the buffer status reporting is triggered and a predetermined condition is satisfied.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to an embodiment of the present invention, the UE periodically reports the buffer status to the Node B in the following manner: if there is a possibility that the Node B will allocate a transmission resource to the UE in the near future, the UE stands by for a predetermined period of time and, if a transmission resource is allocated, transmits a buffer status report message. If there is no possibility that the Node B will allocate a transmission resource to the UE, the UE transmits a buffer status report message as soon as a buffer status report is triggered. Therefore, even if the time to transmit a buffer status report message arrives while no transmission resource has been allocated, a buffer status report message is transmitted after a transmission resource is allocated. This advantageously simplifies the procedure for transmitting a buffer status report message.

It is to be noted that, although embodiments of the present invention will be described with reference to an LTE (Long Term Evolution) system as an example, the present invention is not limited to it and is applicable to any type of communication system.

The LTE system, to which the present invention is applied, will now be described briefly prior to descriptions of embodiments of the present invention.

Figure 1:
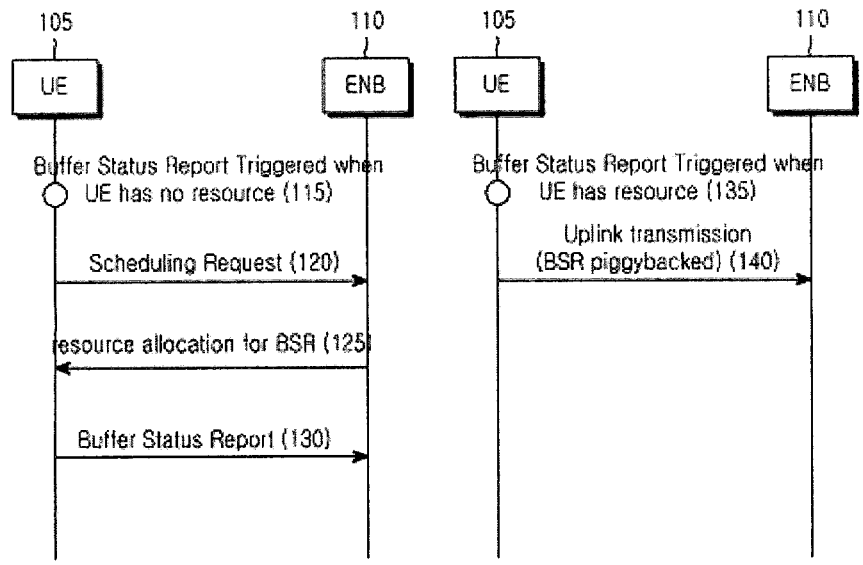
FIG. 1 is a flowchart illustrating a scheme for periodically reporting the buffer status according to the prior art.
Figure 2:
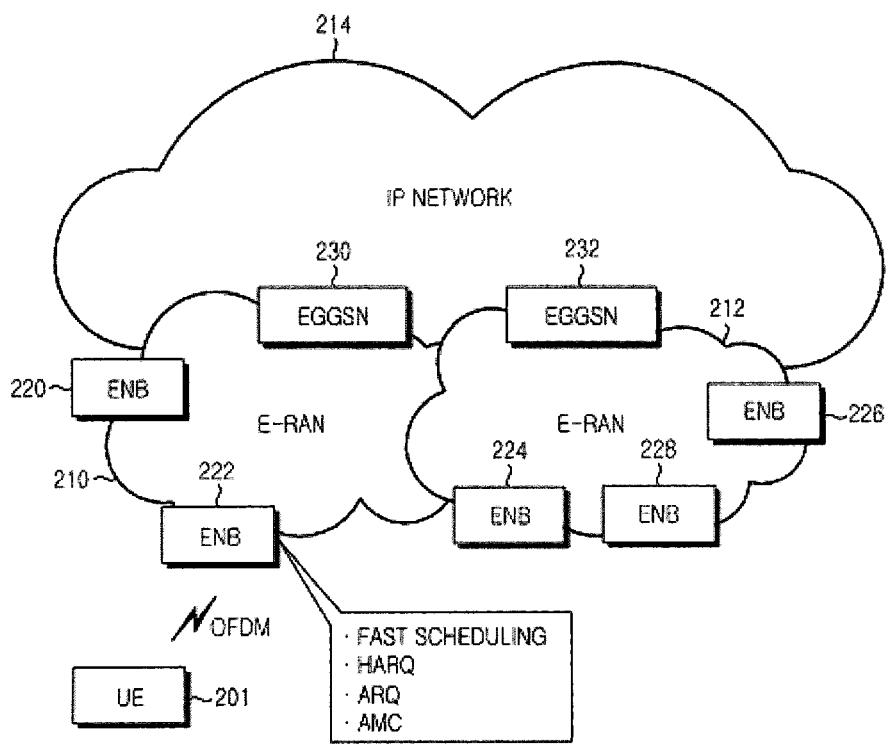
FIG. 2 is a block diagram illustrating an LTE mobile communication system.

FIG. 2 shows an exemplary structure of an LTE mobile communication system to which the present invention is applied.

Referring to FIG. 2, E-RANs (Evolved UMTS Radio Access Networks) 210 and 212 have a simple two-node structure including evolved Node Bs (hereinafter, referred to as ENBs or Node Bs) 220, 222, 224, 226, and 228 and anchor nodes 230 and 232. The UE (User Equipment) 201 accesses the IP (Internet Protocol) network by means of the E-RANs 210 and 212.

The ENBs 220-228 correspond to existing Node Bs in the UMTS system, and are connected to the UE 201 via wireless channels. The ENBs 220-228 aggregate information regarding the conditions of UE 201 and schedules the UE 201, and are in charge of functions regarding wireless resource management. The ENBs 220-228 are provided with a control protocol, such as RRC (Radio Resource Control).

In order to realize a maximum transmission rate of 100 Mbps, the LTE employs the OFDM (Orthogonal Frequency Division Multiplexing) as the wireless access technology in the 20 Mhz bandwidth. In addition, the LTE adopts an AMC (Adaptive Modulation& Coding) scheme, in which the modulation scheme and the channel coding ratio are determined according to the channel condition of the UE.

Figure 3:
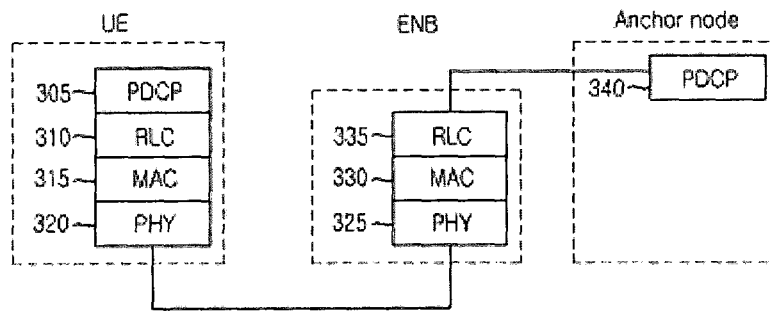
FIG. 3 illustrates a protocol stack of an LTE mobile communication system.

FIG. 3 shows a protocol stack of an LTE mobile communication system to which the present invention is applied.

Referring to FIG. 3, PDCP (Packet Data Convergence Protocol) layers 305 and 340 are adapted for compression/decompression and ciphering/deciphering of IP headers. In RLC (Radio Link Control) layers 310 and 335, a PDCP PDU (Packet Data Unit) is reconstructed to an appropriate size (hereinafter, a packet outputted from a specific protocol entity is referred to as a PDU of the protocol), and the reconstructed packets are subjected to an ARQ (Automatic Repeat reQuest) operation. The PDCP layers 305 and 340 and the RLC layers 310 and 335 constitute at least one PDCP entity (i.e. PDCP device) or at least one RLC entity (i.e. RLC device), which can be constructed for each service or flow when communication begins, and process data packets by using each entity. As shown in FIG. 3, the PDCP layers 305 and 340 are located on the UE and the anchor node, respectively, and the RLC layers 310 and 335 are located on the UE and the ENB, respectively.

MAC layers 315 and 330 are connected with various RLC entities, and are adapted to multiplex RLC PDUs into MAC PDUs and demultiplex MAC PDUs into RLC PDUs.

Physical layers 320 and 325 are adapted to channel-code anchor layer data (i.e. MAC PDUs), modulate them into OFDM symbols, and transmit them through wireless channels. In addition, the physical layers 320 and 325 receive OFDM symbols via wireless channels, demodulate and channel-decode them, and transfer them to the anchor layer.

The UE according to an embodiment of the present invention has a Node B-estimated buffer status (hereinafter, referred to as EBS) parameter, a first timer, and a second timer.

The EBS parameter corresponds to the buffer status of the UE as estimated by the Node B, and is managed by the UE. The EBS has a value corresponding to either "empty" or "non-empty".

It means that, if the EBS is set to "empty", the Node B regards that the buffer of the UE is empty. Therefore, there is no possibility that the Node B will allocate a transmission resource to the UE unless the UE separately reports the buffer status.

It means that, if the EBS is set to "non-empty", the Node B regards that data is stored in the buffer of the UE. Therefore, there is a possibility that the Node B will allocate a transmission resource to the UE, even if the UE does not separately report the buffer status.

According to an embodiment of the present invention, the UE checks the EBS every time it has to make the periodic buffer status report, and, if the EBS is "non-empty", the UE stands by for a predetermined period of time without transmitting a buffer status report message. If the UE is allocated a transmission resource thereto for the period of time, the UE transmits a buffer status report message to the Node B by using the allocated transmission resource. If the UE fails to be allocated a transmission resource until the period of time elapses, the UE is allocated a transmission resource for a buffer status report thereto according to a predetermined procedure (e.g. scheduling request) as in the case of the prior art, and transmits a buffer status report message by using the allocated transmission resource. On the other hand, if the EBS is "empty", the UE is allocated a transmission resource for a buffer status report thereto according to a predetermined procedure with no standby, and transmits a buffer status report message to the Node B by using the allocated transmission resource.

For convenience of description, the procedure for transmitting a buffer status report message according to the present invention will now be divided into two and described accordingly.

The first buffer status report message transmission procedure: it is used when there is no uplink transmission resource for piggybacking a buffer status report message. For example, the UE transmits a small-size uplink signal, such as a scheduling request, to the Node B, which then is allocated a predetermined transmission resource in response of the uplink signal from the Node B. The allocated transmission resource is used to transmit a buffer status report message to the Node B.

The second buffer status report message transmission procedure: it is used when there is an uplink transmission resource for piggybacking a buffer status report message. The UE piggybacks a buffer status report message onto uplink data and transmits it.

Figure 4:
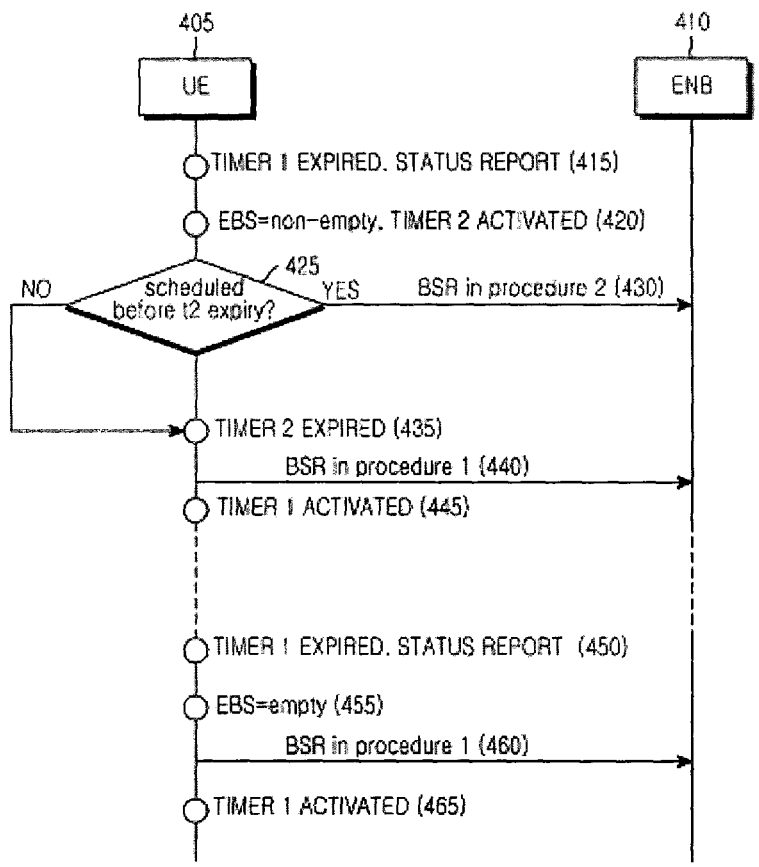
FIG. 4 is a flowchart illustrating an overall operation according to an embodiment of the present invention.

FIG. 4 shows the overall operation according to an embodiment of the present invention.

Referring to FIG. 4, a specific situation occurs at a point of time, in which the UE 405 must make a periodic buffer status report (415). For example, if the first timer that been activated after completely transmitting the preceding buffer status report message expires, the UE recognizes that it must make a periodic buffer status report.

The UE checks the EBS at that point of time and, if the EBS corresponds to "non-empty", determines that the Node B is likely to allocate a transmission resource to the UE in the near future. Then, the UE activates the second timer and stands by without transmitting a buffer status report message in response (420).

If the Node B allocates a transmission resource to the UE before the second timer expires (425), the UE transmits a buffer status report message to the Node B according to the above-mentioned second buffer status report message transmission procedure (430). In other words, the UE piggybacks a buffer stature report message onto data transmitted through the uplink, and transmits it. After the buffer status report message has been completely transmitted, the UE activates the first timer to check the point of time to transmit the next periodic buffer status report message.

On the other hand, if the Node B fails to allocate a transmission resource to the UE until the second timer expires (435), the UE transmits a buffer status report message to the Node B according to the above-mentioned first buffer status report message transmission procedure (440). Particularly, the UE transmits an uplink signal (e.g. scheduling request) through the uplink so that a transmission resource is allocated. Then, the UE transmits a buffer status report message by using the allocated transmission resource. After the buffer status report message has been completely transmitted, the UE activates the first timer to check the point of time to transmit the next periodic buffer status report message (445).

If the first time expires and if the UE is supposed to proceed with a periodic buffer stature report (450), the UE checks the EBS again. If the EBS has been set to "empty" (455), i.e. if there is no possibility that a transmission resource will be allocated to the UE within a predetermined period of time, the UE transmits a buffer status report message to the Node B according to the first buffer status report message transmission procedure (460). Particularly, the UE transmits an uplink signal (e.g. scheduling request) so that a transmission resource is allocated. Then, the UE transmits a buffer status report message by using the allocated transmission resource. After the buffer status report message has been completely transmitted, the UE activates the first timer to check the point of time to transmit the next periodic buffer status report message (465).

Figure 5:
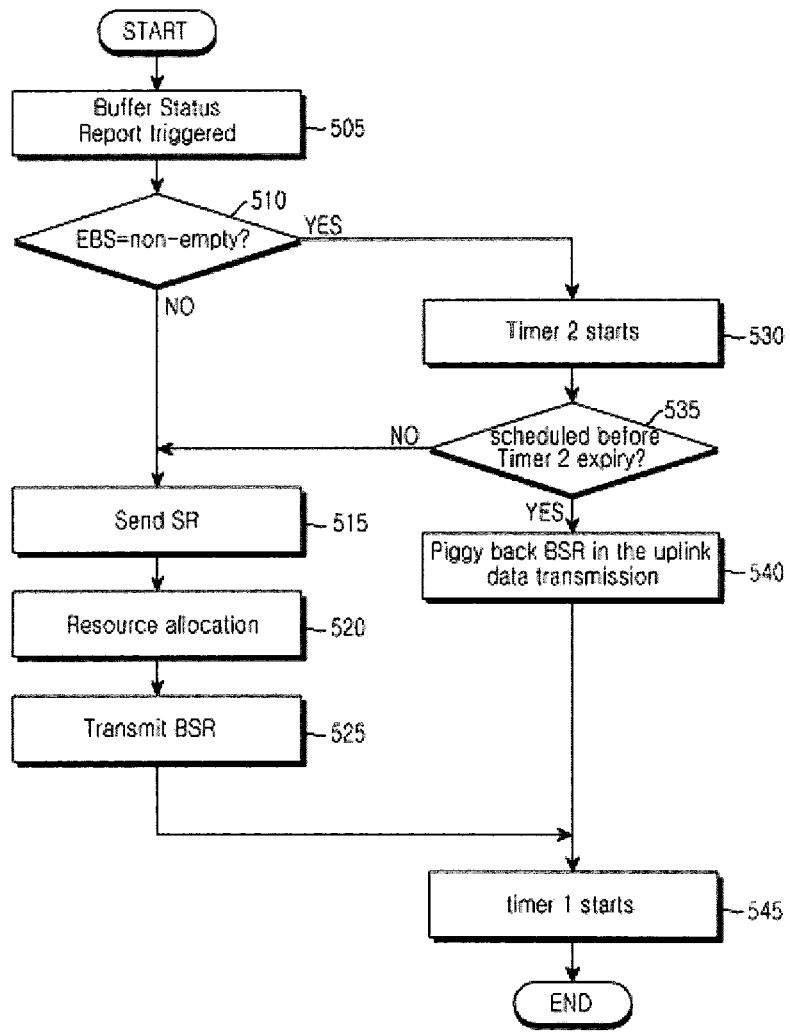
FIG. 5 is a flowchart illustrating an operation of a UE according to an embodiment of the present invention.

FIG. 5 shows the operation of the UE according to an embodiment of the present invention.

Referring to FIG. 5, if a buffer status report is triggered in step 505, the UE proceeds to step 510 and checks the EBS.

If the EBS corresponds to "empty", the UE proceeds to step 515 and conducts the first buffer status report message transmission procedure.

In order to conduct the first buffer status report message transmission procedure, the UE transmits a scheduling request signal by using a physical channel in order to request resource allocation for transmitting a buffer status report in step 515. After a transmission resource is allocated in step 520, the UE transmits a buffer status report message by using the allocated transmission request in step 525. Then, the UE activates the first timer for a periodic buffer status report in step 545.

On the other hand, if the EBS corresponds to "non-empty", i.e. if there is a possibility that the Node B will allocate a transmission resource to the UE without a separate scheduling request of the UE, the UE proceeds to step 530 and activates the second timer in order to conduct the second buffer status report message transmission procedure.

If a transmission resource is allocated to the UE before the second timer expires, the UE proceeds to step 540. Then, the UE piggybacks a buffer status report message onto uplink data, which is transmitted based on the allocated transmission resource, and transmits the buffer status report message. The UE then proceeds to step 545 and activates the first timer for a periodic buffer status report.

On the other hand, if no transmission resource is allocated until the second timer expires, the UE proceeds to step 515 and follows the above-mentioned first buffer status report message transmission procedure.

The shorter the first timer is set for the periodic buffer status report, the more frequently the UE transmits a buffer status report message, which results in unnecessary data transmission. If the first timer is set to be excessively long when the UE is executing a delay-sensitive service, the buffer status report message transmission may be delayed, which degrades the service quality. Therefore, the first timer is set based on consideration of the type of service executed by the UE, the required service quality, etc.

Those skilled in the art can understand that, if the second timer has been activated, the Node B is aware of the fact that there is uplink data to be transmitted from the buffer of the UE. Therefore, as long as the Node B has a transmission resource to allocate, the Node B will allocate it to the UE. However, if the UE presumes the Node B to be aware of the fact that the UE has transmission data while the Node B actually considers that the UE has no transmission data, the Node B will allocate no transmission resource no matter how long the UE may wait. In order to prevent the UE from waiting forever in such a situation, the present invention proposes that the second timer be used. Considering that such an erroneous situation rarely occurs in a normal network, the second timer preferably has a sufficiently large setup value.

As mentioned above, the EBS is a parameter for storing a value corresponding to an estimation made by the UE regarding how the Node B will recognize the buffer condition of the UE.

In order to ensure that the EBS has a value reflecting the accurate buffer condition of the UE as recognized by the Node B, the UE transmits the last data together with a "last data indicator" according to the present invention. If the Node B receives data containing a last data indicator from the UE, the Node B recognizes that there is no more data stored in the buffer of the UE. After the data containing the last data indicator has been completely transmitted, the UE sets the EBS to "empty".

It is to be noted that the UE uses all transmission resources allocated by the Node B. It means that, if a padding has been inserted into data transmitted by the UE, the UE has no more data to transmit. Therefore, the last data indicator may be replaced with a padding. More particularly, if the UE has a sufficient amount of allocated transmission resources so that it can insert a padding into the last data, the last data indicator is not necessarily inserted because the padding acts as the last data indicator. Therefore, if the Node B receives data containing a padding, the Node B determines that the corresponding UE has no data, even if no last data indicator has been found to be inserted therein.

Figure 6:
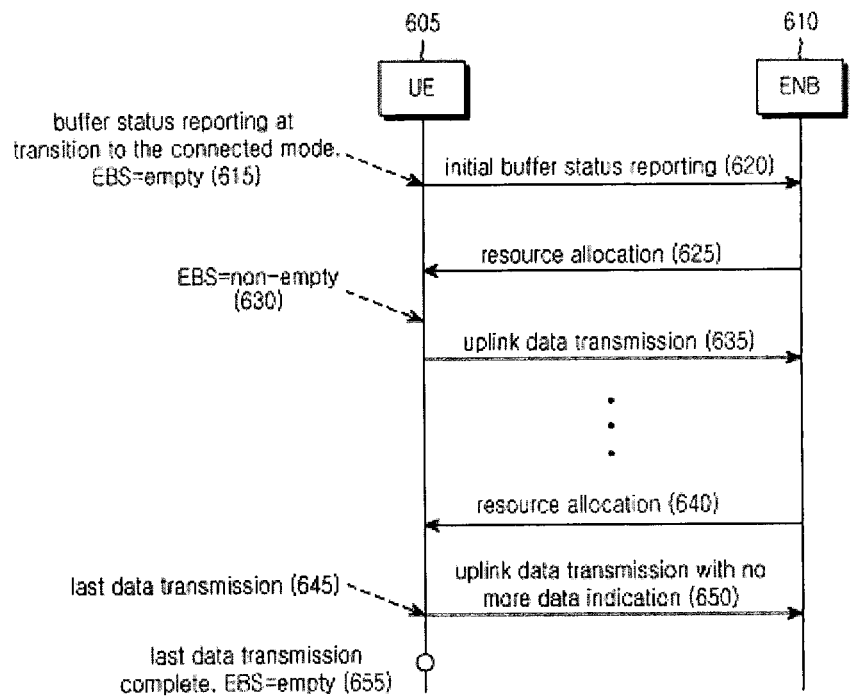
FIG. 6 is a flowchart illustrating an operation for setting a Node B-estimated buffer status parameter by a UE according to an embodiment of the present invention.

FIG. 6 shows a detailed process for setting the EBS by the UE.

Referring to FIG. 6, as the UE 605 switches from an idle state to a connected state, the UE initializes the EBS as "empty" (615), and transmits the first buffer status report message to the Node B 610 (620). After the UE 605 is allocated a transmission resource from the Node B 610 (625), the UE 605 sets the EBS to "non-empty" (630), and transmits uplink data by using the allocated transmission resource (635).

If the time comes to transmit the last data stored in the buffer while the EBS has been set to "non-empty" (645), the UE 605 piggybacks a last data indicator into the last data and transmits them together (650). After the data containing the last data indicator has been completely transmitted, the UE 605 sets the EBS to "empty" (655).

Figure 7:
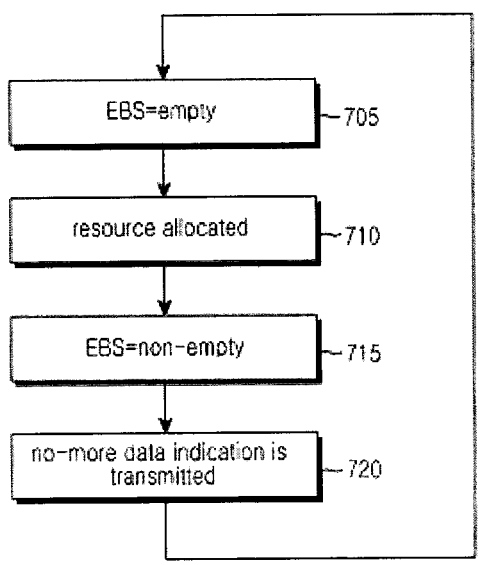
FIG. 7 is a flowchart illustrating an operation for setting a Node B-estimated buffer status parameter by a UE according to an embodiment of the present invention.

FIG. 7 is a flowchart showing a process for setting the EBS by the UE.

Referring to FIG. 7, the UE initializes the EBS as "empty" when it initially switches from an initial state to a connected state (705). If a transmission resource is allocated to the UE while the EBS has been set to "empty" (710), the UE sets the EBS to "non-empty" (715). The UE maintains the EBS as "non-empty" until the data containing the last data indicator has been completely transmitted. If the data containing the last data indicator has been completely transmitted (720), the UE initializes the EBS as "empty" again (705). The UE repeats this operation.

Although an embodiment of the present invention has been described on an assumption that the buffer status report is triggered periodically, the present invention is not limited to that assumption and is applicable to a case, for example, in which the buffer stature report is triggered in response to a specific event. More particularly, according to the present invention, when a buffer status report that has been set to be generated periodically is triggered, the UE checks the EBS and, if the EBS is "non-empty", activates the second timer. If the UE is allocated an uplink transmission resource from the Node B before the second timer expires, the UE transmits a buffer status report by using the allocated uplink transmission resource.

As such, the present invention can be summarized as follows: if there is a possibility that the Node B will allocate a transmission resource to the UE within a short period of time after a buffer status report is triggered, the explicit transmission resource request process of the UE based on buffer status report message transmission, for example, is delayed. This operation is not limited to the periodic buffer status report, and is applicable to a buffer status report triggered by a non-periodic event. For example, assuming that a buffer status report has been triggered by the generating of data having a priority higher than that of data currently stored in the UE, the UE checks the EBS and, if the EBS is "non-empty", activates the second timer. The UE transmits no buffer status report message as long as the second timer is working, but waits for the Node B to allocate a transmission resource to the UE according to a predetermined scheduling operation. Those skilled in the art can easily understand that, if no transmission resource is allocated until the second timer expires, the UE transmits buffer status report message to explicitly request the Node B to be allocated a transmission resource.

Figure 8:
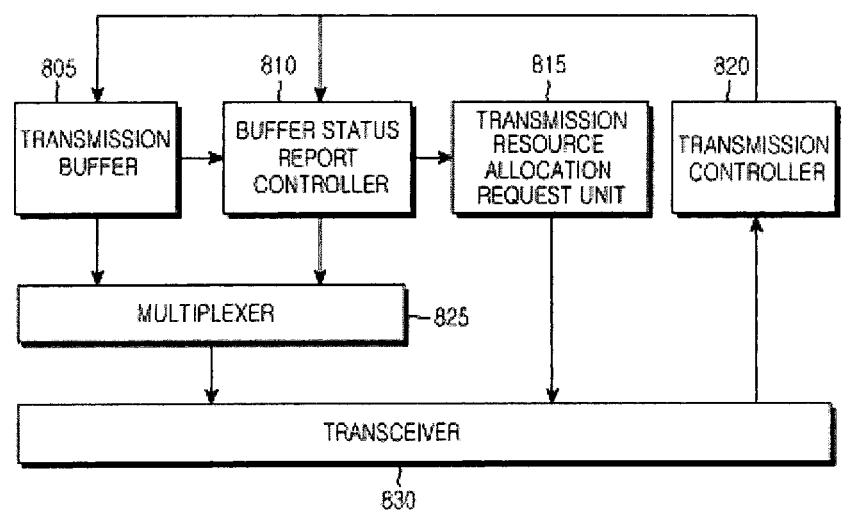
FIG. 8 is a block diagram illustrating a UE device according to an embodiment of the present invention.

FIG. 8 is a block diagram showing a UE device according to an embodiment of the present invention.

Referring to FIG. 8, the UE according to an embodiment of the present invention includes a transmission buffer 805, a buffer status report controller 810, a transmission resource allocation request unit 815, a transmission controller 820, a multiplexer 825, and a transceiver 830.

The transmission buffer 805 stores anchor layer data, and transmits data to the multiplexer 825 under the control of the transmission controller 820.

The buffer status report controller 810 generates a buffer status report messages if a predetermined condition is satisfied, and transfers it to the multiplexer 825. The buffer status report messages contains information including the amount of data stored in the transmission buffer 805, the priority, etc.

The buffer status report controller 810 manages the EBS, and activates the first timer to be informed of the time to periodically provide a buffer status report message. If the time for periodic reporting has arrived, the buffer status report controller 810 checks the EBS and decides whether or not to activate the second timer. Particularly, the buffer status report controller 810 activates the second timer if the EBS is "non-empty". If a transmission resource is allocated before the second timer expires, the buffer status report controller 810 generates a buffer status report message and transfers it to the multiplexer 825 so that it is transmitted together with data by using the allocated transmission resource.

If the EBS is "empty" or if no transmission resource is allocated until the second timer expires while the EBS is "non-empty", the buffer status report controller 810 instructs the transmission resource allocation request unit 815 to transmit a transmission resource allocation request signal. After a transmission resource is allocated, the buffer status report controller 810 generates a buffer status report message and transfers it to the multiplexer 825.

At the request of the buffer status report controller 810, the transmission resource allocation request unit 815 transmits a transmission resource allocation request signal to the Node B via the transceiver 830 by using uplink transmission resources according to a predetermined procedure.

The transmission controller 820 receives a downlink control channel via the transceiver 830 and checks if there is an allocated transmission resource. If so, the transmission controller 820 instructs the transmission buffer 805 or the buffer status report controller 810 to transfer data to the multiplexer 825.

The multiplexer 825 multiplexes the data, which has been transferred by the transmission buffer 805 or the buffer status report controller 810, into a single packet and transmits it to the transceiver 830.

The transceiver 830 transmits the packet, which has been transferred by the multiplexer 825, via a wireless channel; it transmits a signal, which has been transferred by the transmission resource allocation request unit 815, via the wireless channel; and it transfers a downlink control channel signal, which has been received via the wireless channel, to the transmission controller 820.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method for radio communication with a base station, by a user equipment (UE), the method comprising:
    determining whether to start a first timer based on a predetermined condition, in response to a buffer status reporting triggered;
    starting the first timer in response to the predetermined condition being satisfied;
    in response to an uplink resource for a buffer status report transmission being available before the first timer expires, transmitting an uplink packet including a buffer status report using the available uplink resource; and
    in response to no uplink resource for the buffer status report transmission being available and the first timer expiring, transmitting a scheduling request to the base station.

2. The method of claim 1, further comprising:
    transmitting the scheduling request to the base station without a delay corresponding to the first timer, in response to the predetermined condition being not satisfied,
    wherein the scheduling request is transmitted when the UE does not have an available uplink resource for the buffer status report transmission.

3. The method of claim 1, further comprising: after transmitting the uplink packet including the buffer status report, starting a second timer for a periodic buffer status reporting.

4. The method of claim 3, wherein the buffer status reporting is triggered when the second timer expires.

5. The method of claim 1, wherein the buffer status reporting is triggered when there is no data to be transmitted by the UE to the base station.

6. An apparatus in a user equipment (UE) for radio communication with a base station, the apparatus comprising:
    a controller configured to determine whether to start a first timer based on a predetermined condition, in response to a buffer status reporting triggered, and start the first timer in response to the predetermined condition being satisfied; and
    a transceiver configured to, in response to an uplink resource for a buffer status report transmission being available before the first timer expires, transmit an uplink packet including a buffer status report using the available uplink resource, and, in response to no uplink resource for buffer status report transmission being available and the first timer expiring, transmitting a scheduling request to the base station.

7. The apparatus of claim 6, wherein the transceiver is further configured to transmit the scheduling request to the base station without a delay corresponding to the first timer, in response to the predetermined condition being not satisfied,
    wherein the scheduling request is transmitted when the UE does not have an available uplink resource for the buffer status report transmission.

8. The apparatus of claim 6, wherein the controller is further configured to start, after transmitting the uplink packet including the buffer status report, a second timer for a periodic buffer status reporting.

9. The apparatus of claim 8, wherein the controller is further configured to trigger the buffer status reporting when the second timer expires.

10. The apparatus of claim 8, wherein the buffer status reporting is triggered when there is no data to be transmitted by the UE to the base station.

11. A method for radio communication with a user equipment (UE) by a base station, the method comprising:
    receiving an uplink packet including a buffer status report from the UE using an uplink resource in response to the uplink resource allocated for a buffer status report transmission being available for the UE; and
    receiving a scheduling request from the UE in response to an available uplink resource not being allocated to the UE after a predetermined time after a buffer status reporting is triggered by the UE,
    wherein the scheduling request is received in response to no uplink resource for the buffer status report transmission being available and a first timer expiring, and
    wherein the first timer starts in response to the UE identifying that the buffer status reporting is triggered and a predetermined condition is satisfied.

12. The method of claim 11, wherein the scheduling request is received without a delay corresponding to the first timer in response to the UE determining that the buffer status reporting is triggered and the predetermined condition is not satisfied,
    wherein the scheduling request is received when the UE does not have an available uplink resource for the buffer status report transmission.

13. The method of claim 11, wherein the buffer status reporting is triggered when a second timer for a periodic buffer status reporting expires, and the second timer starts after transmitting the uplink packet including the buffer status report.

14. The method of claim 11, wherein the buffer status reporting is triggered when there is no data to be transmitted by the UE to the base station.

15. An apparatus in a base station for radio communication with a user equipment (UE), the apparatus comprising:
    a receiver configured to receive an uplink packet including a buffer status report and a scheduling request from the UE; and
    a controller configured to allocate an uplink resource to the UE in response to the scheduling request,
    wherein the receiver is configured to receive the uplink packet including the buffer status report from the UE using the uplink resource, in response to the uplink resource allocated for a buffer status report transmission being available for the UE,
    wherein the receiver is configured to receive the scheduling request from the UE in response to an available uplink resource not being allocated to the UE after a predetermined time after a buffer status reporting is triggered by the UE,
    wherein the scheduling request is received in response to no uplink resource for the buffer status report transmission being available and a first timer expiring, and
    wherein the first timer starts in response to the UE identifying that the buffer status reporting is triggered and a predetermined condition is satisfied.

16. The apparatus of claim 15, wherein the scheduling request is received without a delay corresponding to the first timer in response to the UE determining that the buffer status reporting is triggered and the predetermined condition is not satisfied,
    wherein the scheduling request is received when the UE does not have an available uplink resource for the buffer status report transmission.

17. The apparatus of claim 15, wherein the buffer status reporting is triggered when a second timer for a periodic buffer status reporting expires, and the second timer starts after transmitting the uplink packet including the buffer status report.

18. The apparatus of claim 15, wherein the buffer status reporting is triggered when there is no data to be transmitted by the UE to the base station.

\* \* \* \* \*